No. 794,514.

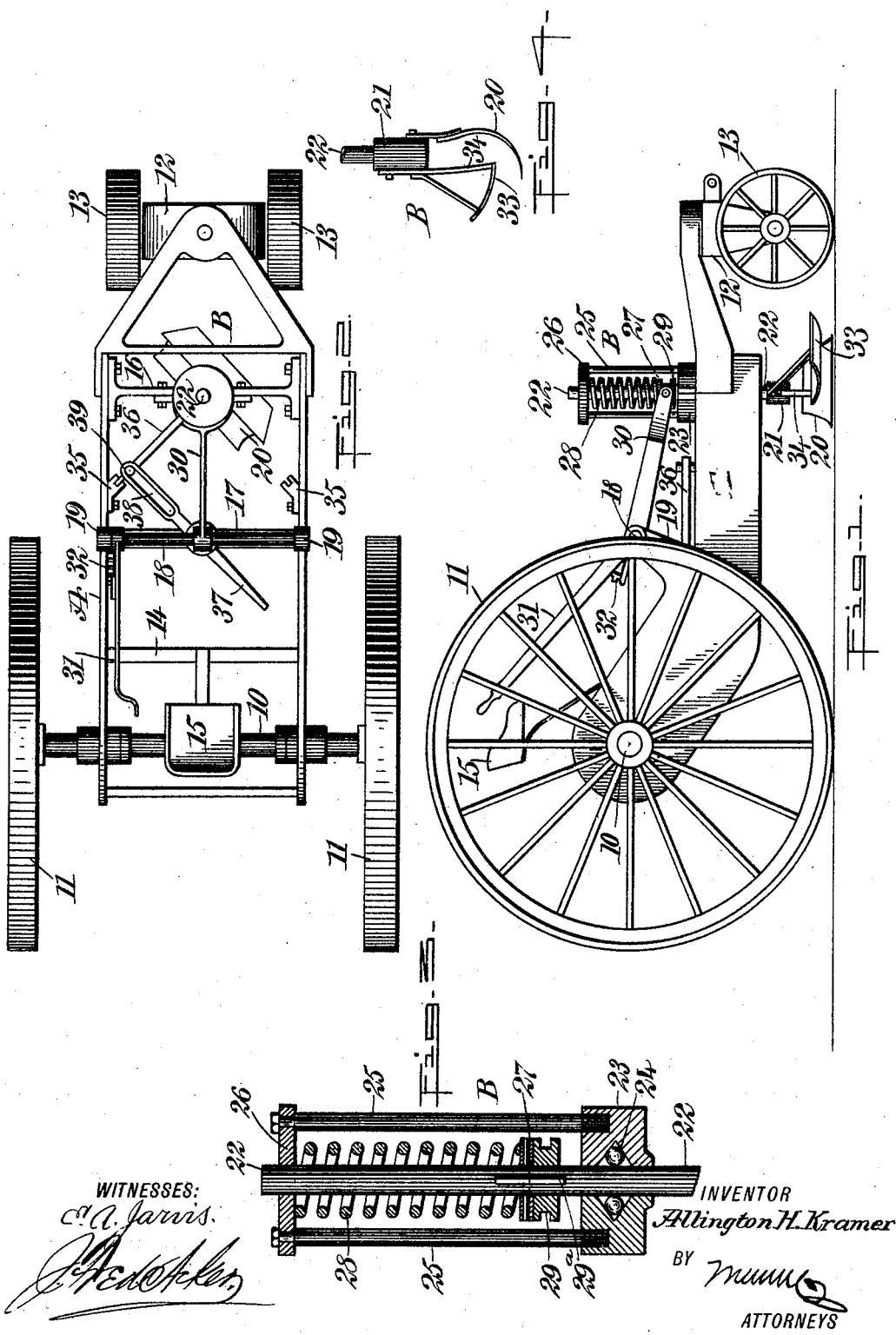

Patented July 11, 1905.

UNITED STATES PATENT OFFICE.

ALLINGTON H. KRAMER, OF MONTEVISTA, COLORADO.

MACHINE FOR TOPPING BEETS.

SPECIFICATION forming part of Letters Patent No. 794,514, dated July 11, 1905.

Application filed July 21, 1904. Serial No. 217,499.

*To all whom it may concern:*

Be it known that I, ALLINGTON H. KRAMER, a citizen of the United States, and a resident of Montevista, in the county of Rio Grande and State of Colorado, have invented a new and Improved Machine for Topping Beets, of which the following is a full, clear, and exact description.

My invention relates to a machine particularly adapted for topping beets in the ground.

The purpose of the invention is to provide durable and effective devices for topping the beets and means for controlling the topping devices, so that whether or not the beets extend more or less out of the ground all the beets will be topped in a uniform manner.

Another purpose of the invention is to construct a machine of the character mentioned in a very simple, durable, and economic manner and so that it may be quickly brought into action when the field is reached and as readily and rapidly carried out of action when the machine is to be taken from the field.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved implement. Fig. 2 is a plan view of the same. Fig. 3 is an enlarged vertical section taken through the support and the controlling mechanism for the topper and gage, and Fig. 4 is a detail side elevation of the topper and gage.

The frame A may be of any desired construction and is shown as provided with a rear axle 10, having large supporting-wheels 11, and a forward pivoted truck 12, having smaller supporting-wheels 13. The body of the frame is provided with a rear cross-bar 14, to which the driver's seat 15 is secured; a forward cross-bar 16, which carries the topping mechanism; an intermediate cross-bar 17, and a shaft 18, journaled in suitable bearings 19 a desired distance above the intermediate cross-bar 17.

The topping device B acts upon the upper or exposed portions of the beets to top the same and is generally used in connection with any appropriate mechanism for dislodging the beets acting in advance of the latter. The topping device consists of a downwardly and forwardly curved blade 20, secured to what may be termed a "head-block" 21, and a vertical shaft 22 is attached to or is formed integral with the said head-block. The topping device B occupies an oblique position with reference to the rows of beets to be topped, as is shown in Fig. 2. The vertical shaft 22 is mounted to slide in a box 23, supported by the cross-bar 16, which box is provided with friction-rollers 24, engaging with the said shaft, so as to relieve the shaft from all undue friction, and, if desired, more than one such box may be employed.

A cage is erected on the box 23, consisting of any desired number of uprights 25, as shown in Figs. 1 and 3, and a cap 26, which is supported by the uprights, is provided with an opening through which the vertical shaft 22 has movement. A disk 27 is secured to the shaft 22 within the lower portion of the cage, the attachment being made by an inserted pin or the like, and a spring 28 is coiled around the shaft 22 within the cage, extending from the disk 27 to the upper cap 26 of the cage, so that the shaft 22 may be pressed upward, and when pressed upward the spring will be under tension, and the moment that upward pressure is discontinued from the bottom of the shaft 22 the spring 28 will return to its normal position, carrying the shaft 22 downward. This spring 28 is preferably a light spring, and as it is intended that the spring shall have such action on the shaft 22 that when the topping device B is brought in engagement with the upper portion of a beet extending farther from the ground than its fellows the said topping device will cut off the same amount of material from the top of a projecting beet as it would from the top of a beet extending the ordinary distance above the surface of the ground. In fact, it is the intention of the construction just described to enable the topping device B to accommodate itself to irregularities in the position of the beets in a row and yet to practically cut off the same amount from each beet over which it passes.

In order that the shaft 22 may be raised at any time, a collar 29 is mounted for sliding movement on the shaft 22, being guided on the said shaft by means of a feather $29^a$. The forked end of a shifting-link 30 is suitably fitted in a groove produced in the said collar 29, as is shown in Fig. 1, and this link 30 is attached to the shaft 18, as is shown best in Fig. 2. A hand-lever 31 is secured to the shaft 18, and this hand-lever is within convenient reach of the driver's seat 15. Ordinarily the lever 31 is located at the left-hand side of the said seat; but it may be differently placed. This lever 31 is provided with the usual thumb-latch, and the said thumb-latch is adapted for engagement with a suitably-placed rack 32, as is also shown in Fig. 2.

In order to gage the depth at which the topping device B shall cut the beets, I employ a gage 33, which is located at the forward side of the topping device above its cutting edge and is attached to or is integral with a shank 34, adjustably attached to the head-block 21. The shaft 22, carrying the topping device and guide or gage, is held in position by means of an arm 36, which is attached to the said shaft 22 near its lower end.

It is frequently necessary to change the angle of the said topping and gage device—as, for example, it may have an inclination in one direction when working a row from the right forwardly in direction of the left-hand side of the machine, and when operating in another direction the disposition of the parts just referred to would necessarily be changed, having an inclination at such time from the right rearwardly in direction of the left-hand side of the frame. This is accomplished by providing sockets 35 at the inner side faces of the frame A, the arm 36 being removably secured in one or the other socket by means of suitable pins. The shifting of the arm 36 from one socket 35 to another is brought about through the medium of a lever 37, suitably fulcrumed at the upper portion of the main frame A, preferably on the upper face of the intermediate cross-bar 17, which lever is provided with a loop-section 38, receiving a pin 39, located on the arm 36, as is shown best in both Figs. 1 and 2.

Having thus described my invention, I claim as new and desire to secure by Letters Patent—

1. In a machine for topping beets, a wheel-supported frame, and a topping device carried by the said frame, which topping device consists of a shaft, bearings in which the said shaft is mounted for end movement, a tension device normally forcing the said shaft in a downward direction, a lever connected with the said shaft, being adapted to raise the same, which lever is fulcrumed upon the frame, a blade located at the lower end of the shaft, said blade having its outer face concaved, a curved gage located above the concaved surface of the blade, said gage being parallel with the said blade and both the blade and the gage being located obliquely with reference to the sides of the frame.

2. In a machine for topping beets, a wheel-supported frame, bearings supported by said frame, a cage extending upward from one of the bearings, a shaft having end and rotary movement in the said bearings, a spring located around the shaft within the said cage, normally exerting downward pressure on the shaft, a blade having a concaved outer and a convexed inner face secured to one side of the lower portion of the shaft, a gage secured to the opposite side of the lower portion of the said shaft parallel with the blade, said gage having an upper concaved and a lower convexed face, the gage and the blade occupying an oblique position with reference to the sides of the frame, a lever carried by the frame for lifting the said shaft, and a shifting device also carried by the frame and connected with said shaft, imparting thereto rotary adjustment, causing the position of the gage and blade to be changed when desired.

3. In a machine for topping beets, a spring-controlled shaft having vertical and end movement, roller-bearings for the said shaft, a frame supporting the roller-bearings, devices for imparting rotary and end movement to the shaft, a blade carried by the lower end of the shaft, having a concaved outer and convexed inner face, a gage located at the opposite side of the shaft just above said blade and parallel therewith, the gage occupying substantially a horizontal position, extending beyond the cutting edge of the blade, the lower face of the gage being convexed and its upper face concaved.

4. In a machine for topping beets, a vertically-supported shaft capable of rotary movement, a blade secured to the lower end of the shaft at one side, having a concaved outer and a convexed inner face, and a gage attached to the opposite side of the lower end of the shaft, extending parallel with the said blade but at an angle thereto at a point above its cutting edge, the gage being separated from the said blade, occupying substantially a horizontal position and having a lower convexed and an upper concaved face.

5. In a machine for topping beets, a frame having forward and rear supporting-wheels, ball-bearings carried by the said frame between the forward and rear wheels, a spring-controlled shaft having rotary and end movement in the said bearings, the said shaft occupying a vertical position relative to the frame, a blade secured to the lower end of the shaft at one side, having a concaved outer and a convexed inner face, a gage secured to the opposite side of the lower end of the shaft, being at the front of the said blade and at an angle thereto, the said gage occupying substantially a horizontal position, extending to the rear and forward of the cutting edge of the blade, the lower face of the gage being convexed and its outer face concaved, a lever fulcrumed on the frame for raising the said shaft, an arm attached to the shaft, sockets carried by the frame, in which the outer end of the said arm is adapted to be adjustably secured, and a shifting-lever connected with the said arm, whereby when the said arm is disengaged from the socket the said shaft through the medium of the said arm and lever connected therewith can be turned to shift the position of the blade and gage, the said gage and blade in working position being oblique to the sides of the frame, as set forth.

In testimony whereof I have signed my name to this specification in the presence of two subscribing witnesses.

ALLINGTON H. KRAMER.

Witnesses:
WILLIAM J. EN EARL,
LEWIS K. KRAMER.